United States Patent [19]

DeTorre

[11] Patent Number: 4,725,171
[45] Date of Patent: Feb. 16, 1988

[54] DRILL FOR ARAMID COMPOSITES

[76] Inventor: Robert P. DeTorre, 321 Barclay Ave., Pittsburgh, Pa. 15221

[21] Appl. No.: 585,881

[22] Filed: Mar. 2, 1984

[51] Int. Cl.$^4$ .............................................. B23B 51/00
[52] U.S. Cl. ..................................... 408/213; 407/54; 408/704
[58] Field of Search .............. 408/211, 212, 213, 230, 408/144, 704; 407/53, 54; 144/219

[56] References Cited

U.S. PATENT DOCUMENTS

| | | | |
|---|---|---|---|
| 1,476,019 | 12/1923 | Lowry | 407/54 |
| 1,781,863 | 11/1930 | Shoemaker | 408/211 X |
| 2,640,379 | 6/1953 | Graves | 408/229 X |
| 4,034,452 | 7/1977 | Edminy | 408/226 X |
| 4,285,620 | 8/1981 | Luebbert et al. | 408/212 |
| 4,338,050 | 7/1982 | Ozer et al. | 408/211 X |
| 4,395,169 | 7/1983 | Kashiwagi et al. | 408/211 X |

FOREIGN PATENT DOCUMENTS 0149114  9/1983  Japan .................................. 408/230

*Primary Examiner*—Z. R. Bilinsky

[57] ABSTRACT

A rotary carbide drill for drilling clean holes in aramid fiber composites is made from a cylindrical rod having a planar elliptical end surface. The drill has a longitudinally extending arcuate flute that becomes shallower as it progresses away from the end surface. The arcuate flute is generated with a diamond wheel or disc having a periphery with a semi-cylindrical cross-section in a manner so that each of two radial segments alternate as the lead cutting surfaces, providing essentially equal wear on the segments so that frequent dressing of the wheel is eliminated.

10 Claims, 10 Drawing Figures

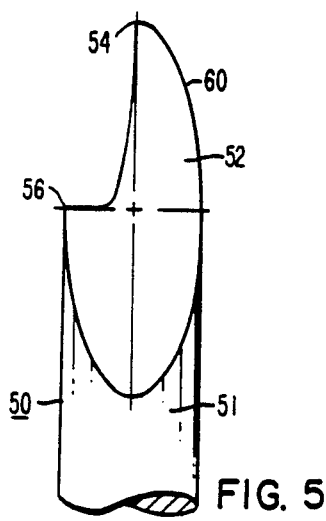
FIG. 5
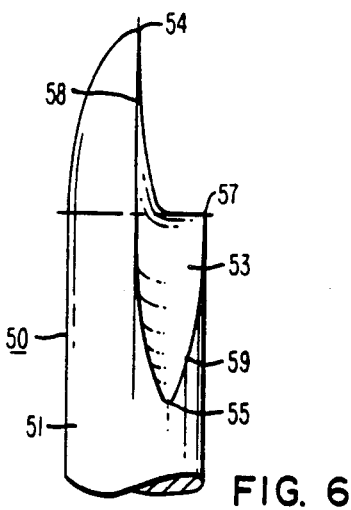
FIG. 6
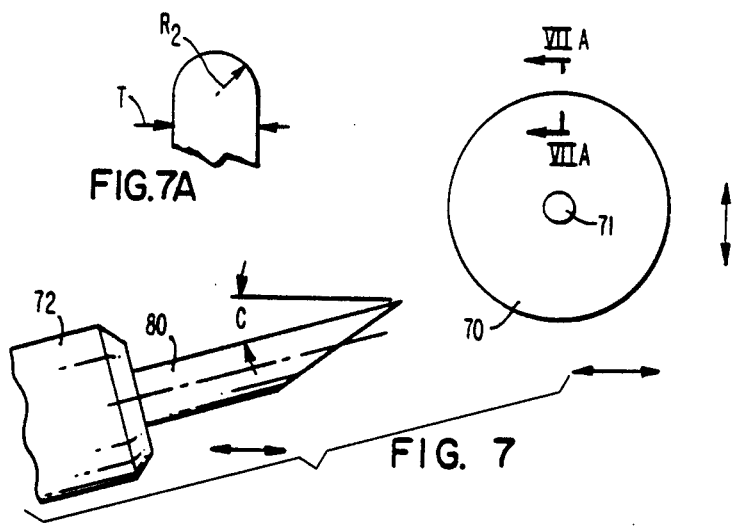
FIG. 7A
FIG. 7
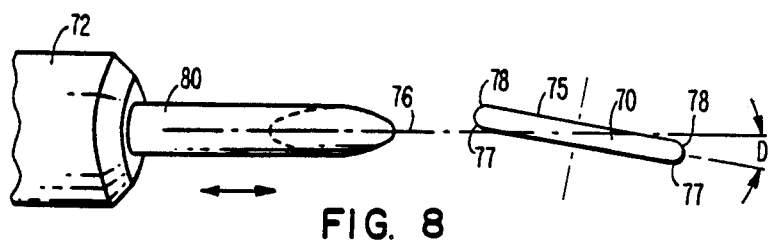
FIG. 8

DRILL FOR ARAMID COMPOSITES

BACKGROUND OF THE INVENTION

1. Field of the Invention

This invention relates to a drill or drill bit, particularly a rotary carbide drill, especially adapted for drilling holes in laminates and other composite structural materials which contain aramid fibers or fabrics comprising aramid fibers and to methods of making such drills.

2. Description of the Prior Art

Aramid or aromatic amide polymer fibers and fabrics made from such fibers are being advantageously employed in composite materials in place of glass fibers. Glass fiber laminates, e.g., are made from a plurality of woven glass fabric reinforcing sheets impregnated and bonded together by organic resins such as epoxy resins. Such laminates have desirable physical properties. The laminates and other composite materials are suitable for various structures and are widely used as substrates for printed circuits. The composite materials must sometimes be provided with accurately sized, clean holes with essentially no projecting fibers or fiber portions from the surface of the hole. The high strength of the inorganic glass fibers and the abrasiveness of the glass fibers make it difficult to provide such holes. Rotary carbide drills, e.g. tungsten carbide or titanium carbide, have effectively provided such holes.

New organic fibers of aramid (aromatic amide) have a combination of outstanding physical properties even superior to glass, exhibiting tensile strengths in excess of 300,000 psi, a high modulus and relatively low specific gravity. Composites comprising aramid fibers appear to have application in aircraft and aerospace structures as well as in substrates for printed circuits, particularly in resin bonded aramid fiber laminates similar to the glass fiber laminates described above. However, it appears that some of the properties which provide the aramid fiber composites with desirable physical advantages over the glass fiber composites, create other difficulties. The machining of aramid fiber composites is difficult compared even to the already difficult to machine glass fiber composites. This is particularly true when drilling holes. The high strength aramid fibers are difficult to shear or cut and the problem is apparently compounded by the softer resin binder, into which fibers may be forced and thus escape clean, uniform shearing or cutting. In any event, it is known that holes drilled in resin bonded laminates of aramid fiber reinforcing sheets or other aramid composites, are too frequently fuzzy or frayed. Such holes are particularly unacceptable in printed circuit substrates where the hole surfaces are metal plated to provide a conductive path from a metal layer on one side of the substrate to a metal layer on the other side of the substrate.

While it may be necessary and, indeed, known to employ carbide materials for the drills for aramid composites to provide an acceptably hard and abrasion resistant tool, the hardness makes it difficult to generate complex geometries in such drills. The drill points, flutes, cutting edges, relief angles, etc. must generally be generated in such hard materials with even harder diamond cutting tools. It should be apparent that simple geometries are particularly advantageous in drills of such materials because they are more easily generated.

SUMMARY OF THE INVENTION

It is an object of this invention to provide a hard, durable drill with a relatively simple geometry, which may be easily generated with a diamond wheel. This drill is especially suitable for making high quality accurately dimensioned holes in composites or laminates of aramid fibers.

The rotary drill of this invention is made from cylindrical carbide rod stock. A flat, angular end surface, commonly known as a spade tip, is provided by cutting the cylindrical rod at an angle to the axis of the cylinder rod with a rotating diamond cutting wheel. The end surface of the cut rod will be elliptical. An arcuate flute is ground into the cylindrical rod with a rotating, radiused circular diamond cutting wheel. The arcuate flute extends generally longitudinally along a portion of the rod from the planar elliptical end surface and within one of the quadrants of the cross-section of the rod. The edges of the flute converge from the planar end surface to a terminal point in the cylindrical surface of the rod and provide two cutting edges where they intersect the cylindrical surface. The radial flute also provides two axially and radially spaced cutting points which can essentially strike fabric fibers normally, even though the tool is rotating and thus assure the shearing or cutting of any stray fiber ends and consequently high quality hole surfaces free of frayed or fuzzy fiber ends.

BRIEF DESCRIPTION OF THE DRAWINGS

FIG. 5 is a front elevational view of another embodiment of a drill in accordance with this invention;

FIG. 6 is a rear elevational view of the drill illustrated in FIG. 5;

FIG. 7 is a front elevational view, generally illustrating the means for generating the radial flute in the drill blank;

FIG. 7A is a fragmental cross-sectional view along lines A—A of FIG. 7; and

FIG. 8 is a top elevational view of the means illustrated in FIG. 7 but with the disc of FIG. 7 slightly skewed.

DETAILED DESCRIPTION OF THE EMBODIMENTS

Figure 1:
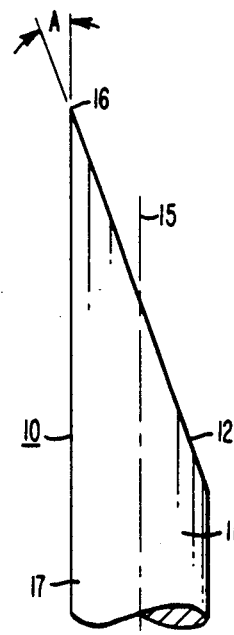
FIG. 1 is a side elevational view of the cylindrical rod blank having a spade end.
Figure 2:
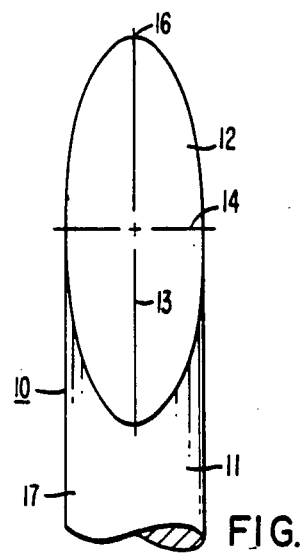
FIG. 2 is a front elevational view of the cylindrical rod blank of FIG. 1, rotated 90 degrees to more clearly illustrate the planar elliptical end surface.

Referring now to FIGS. 1 and 2, a spaded drill rod blank 10 is made from a suitable length of cylindrical carbide drill rod stock 11. The blank 10 has an inclined end surface 12. The angle A of the end surface is best illustrated in the side elevation of FIG. 1. The front elevational view (FIG. 2) best illustrates the elliptical shape of the surface 12. The intersection of the major axis 13 and the minor axis 14 of the elliptical end surface coincides with the axis 15 of the drill rod. The angle A, defined by the planar end surface and the axis of the rod or any line parallel to the axis, e.g. any line on the cylindrical surface, is from about 15° to about 45°. It should be apparent that a small acute angle, e.g. 15°, will provide an ellipse with a longer major axis and a longer spaded surface than a large acute angle, e.g. 45°. Long spaded surfaces are preferred because they provide longer working portions, especially longer cutting edges, more useful in drilling thick composites or large stacks of laminates. The small angles, however, also provide sharper end points that are relatively fragile and are more likely to break. About 15° is the smallest desirable angle for carbide drill stock. Point 16 is the lead vertex of the blank, at the intersection of the elliptical planar end surface with the longest line in circumferential surface of the rod. The line defining the major axis of the ellipse may be projected through the point. FIGS. 1 and 2 do not illustrate the main features of the drill of this invention but are provided to provide a better understanding for the following description, which will refer to other Figures of the drawing, having features added to the blank rod of FIGS. 1 and 2. The axes of the ellipse divide the end surfaces into quadrants and the vertex 16 is at the juncture of the two upper or lead quadrants.

Figure 4A:
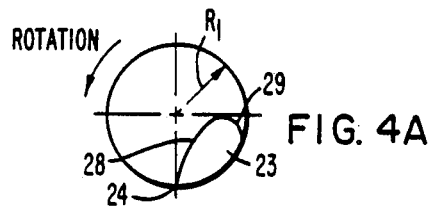
FIG. 4A is a top view of the drill illustrated in FIG. 4.
Figure 3:
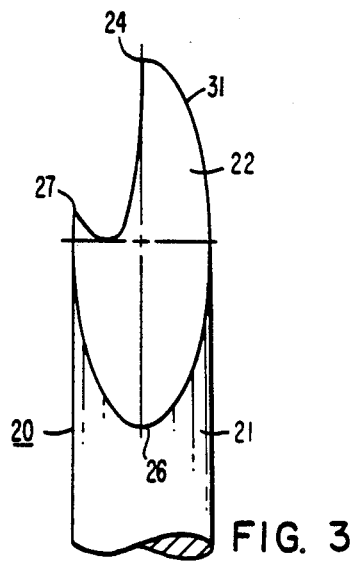
FIG. 3 is a front elevational view of the drill having the radial flute.
Figure 4:
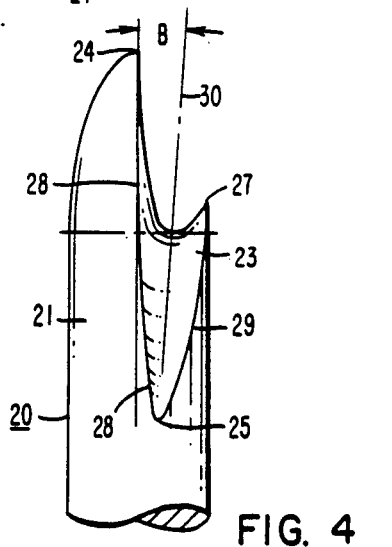
FIG. 4 is a rear elevational view of the drill of FIG. 3, rotated 180 degrees from the view of FIG. 3.

FIGS. 3, 4 and 4A illustrate the preferred embodiment of my invention. The drill 20 is made from a generally cylindrical rod 21 having a radius $R_1$ and an inclined planar surface 22. An arcuated flute 23 (FIGS. 4 and 4A) extends generally longitudinally, preferably skewed, along the rod 21 from the lead vertex 24 of the planar elliptical surface where it has an essentially semi-circular cross-section to a terminus point 25 in the cylindrical surface of the rod. From FIGS. 3, 4 and 4A, it should be apparent and it should be understood that the flute 23 becomes progressively shallower or decreases in depth as it proceeds from the lead vertex or lead cutting point 24 to the terminus 25, where the flute ends. The terminus 25, as illustrated coincides longitudinally with the trailing vertex 26 but it may extend longitudinally beyond or terminate short of 26. The radius or diameter of the flute arc, which has a semi-circular cross-section at the surface 22, should not exceed about one-half of the radius or diameter of the cylindrical rod, and is preferably somewhat smaller than one-half. Thus, if the diameter of a semi-circularly shaped flute is smaller than the radius $R_1$ of the rod, the flute does not extend beyond the major axis of the planar elliptical surface. The lead vertex point or lead cutting point 24 and the axially spaced trailing point 27 act as sequential cutting points as the drill advances into and through the composite. The intersection of the elongated arcuate flute and the cylindrical surface of the rod 21 provides elongated longitudinal cutting edges 28, 29. It is also desirable and preferable to have the axis 30 of the flute oriented at a small acute angle B with respect to the axis of the rod 21. Angle B is preferably up to a maximum of about 12°.

As the rotating drill is advanced into the composite, the lead cutting point 24 will first engage the material. If the drill is rotating clockwise, as viewed from the shank end, the longitudinal cutting edge 28 will engage the material next, and strike the aramid fibers radially as edge passes through the composite. The hooked trailing cutting point 27, longitudinally spaced from cutting point 24, will engage the material next, striking the fibers normally even though rotating. The hooked cutting point 27 is especially effective for a secondary or clean out cut of an already drilled hole. As a secondary drill, drills with a sharp hook point will have a long tool life. Such a drill may, of course, be used for the primary cut but with some sacrifice in tool life because of the substantial wear. In either case, however, the drill provides sequential point, edge, point cutting action that is effective in cutting aramid fiber composites with a hole quality significantly superior to other known drill tools employed for that purpose. Speeds in the range of 4,000 to 22,000 rpm may be employed. It is useful to note that it is desirable to have the lead cutting point 24 located as close as possible to the long axis of the planar elliptical surface to reduce lateral forces on the material being cut.

The drill tool of this invention is also effective when rotated in a counter-clockwise direction but different cutting edges will engage the material. If the drill is advanced with a counter-clockwise rotation (as viewed from the shank end and opposite to direction illustrated in FIG. 4A), the cutting point 24 will first engage the material. The edge 31, i.e. the intersection of the planar elliptical surface with the circumferential surface of the rod, will engage and provide some cutting action on the material. The cutting point 27 will engage the material next and engage any aramid fibers or loose fiber ends normally, followed by the radial cutting provided by edge 29. While the cutting action of the described drill may not be as effective when rotated counter-clockwise as when rotated clockwise, it should be apparent that additional cutting action will be provided by the drill, if it is rotated in a counter-clockwise manner during retraction, after a first advancing clockwise drilling operation. It should also be understood that the drill could be made most effective for initial counter-clockwise operation by providing the described flute on the other side of the major axis of the planar elliptical surface, rather than as illustrated in FIGS. 3, 4 and 4A.

FIGS. 5 and 6 illustrate another embodiment of this invention, a drill 50 that would be more durable and have longer life in primary drilling operations, compared to the drill previously described. The drill is made from a generally cylindrical rod 51 having an inclined planar surface 52 identical to that presented in the previously described Figures, and particularly illustrated in FIGS. 1 and 2. An arcuated flute 52 extends generally longitudinally along the rod 51 from the lead vertex 54 of the planar elliptical surface, where it has an essentially semi-circular cross-section, to a terminus point 55 in the cylindrical surface of the rod. As in the previously described drill, the arcuated flute becomes progressively shallower and decreases in depth as it progresses to 55. In the embodiment, however, the diameter of the flute at the planar elliptical surface is closer in size to the radius of the rod (not illustrated) and/or either has a larger acute angle with respect to the axis of the rod 51 than previously described in FIGS. 3 and 4. Because of these differences, the cutting point 57 does not have the pronounced hook of the previously described embodiment. While the cutting point 56 may be somewhat less effective than a cutting point with a more pronounced hook, it will be more durable and provide longer tool life, particularly in primary drilling operations. Cutting edges 58, 59 and 60 function in the same manner as their counterpart cutting edges in the previous embodiment. The use of the tool is identical with the previously described preferred embodiment and it should be apparent that this embodiment could be used for the primary drilling operation while the previously described embodiment (FIGS. 3, 4, 4A) could be used in a secondary operation.

In further accordance with my invention, the drills can be made very simply compared to other methods for other drills. Referring now to FIG. 7, I have illustrated a rotatable circular wheel or disc 70 having a hub 71 for rotation about an axis perpendicular to the plane of the drawing surface. Manufacturing equipment employing such discs have means for accurately moving the disc up and down (as illustrated by arrows) to effect the desired depth of cut in the workpiece. Means for moving or advancing the rotating disc horizontally to the workpiece are also typically a part of such equipment. A chuck 72 is also typically horizontally movable (as illustrated by arrows) and is designed to hold cylindrical rods. The chuck does not rotate during the cutting operation by the disc but it is designed to permit the cylindrical rod to be angularly adjusted.

In this example, a drill rod blank 80 is mounted in the chuck so that the axis of the rod is at an angle C from horizontal. The angle C will vary with the angle A (see FIG. 1) of the planar elliptical surface of drill rod blank. For example, if the angle A is about 20°, then angle C is about 10°–15° C., if A is about 45°, C. is about 5°. Since the drill rod blank is made from a very hard carbide material, a harder diamond disc is used to grind the flute.

Only a circumferential working segment of the disc is made of the diamond material. Those familiar with such grinding operations know that even the very hard diamond working segments will wear with continued grinding of carbide materials and that eventually the wheel or disc will have to be dressed or restored ot tis original shape. Wheels which have a squared cross-section, for generating angular cuts, wear rather quickly and must be frequently dressed. Such dressing is time consuming and expensive. Even beyond the frequent dressing, such wheels have a relatively short useful life.

I have found that a diamond grinding wheel or disc that has a semi-circular cross-sectional working segment has a longer life when it is employed to grind the arcuate flutes in the drills of this invention. Referring now to FIG. 7A, there is illustrated a grinding wheel or disc having a thickness T and a radius $R_2$. The radius $R_2$ is essentially equal to one-half of T, to provide an essentially semi-circular shaped peripheral segment. $R_2$ may be selected so that it is essentially equal to $R_1$ within a variance of about ±10%.

Referring again to FIG. 7, the drill rod blank 80 is mounted in the chuck so that its axis of rotation and the major axis of the planar elliptical end surface are in a plane parallel to the plane of the drawing. From a collection of diamond discs of different thicknesses, I select a diamond disc having a thickness T that is essentially equal to but not smaller than about 90 percent the radius $R_1$ of rod. The respective positions of the chuck and the periphery of the wheel are adjusted to provide the desired depth of cut. The disc is also adjusted so that its appropriate side surface is aligned with the major axis of the planar elliptical end surface. The disc is then horizontally advanced to begin cutting the arcuate flute in the rod. After the first cut, the disc is adjusted downwardly and the wheel is retracted horizontally to make a second cut. This is continued with equal cuts being made, until the arcuate flute reaches the desired depth. Somewhere between one-third and one-half of planar elliptical surface is removed from one side of the major axis.

It should be apparent that because of the angular orientation of the drill blank, the flute will be progressively shallower as the disc advances horizontally toward and through a portion of the drill blank. The arc segment intercepted by the drill rod will vary uniformly from 180° C. at the end surface (semi-circular cross-section) to zero where the flute terminates.

As more specific examples, I have used a 0.0625 inch thick diamond disc with a semi-circular cross-section to grind flutes in 0.125 inch diameter drill blanks; a 0.085 inch thick disc for 0.187 inch diameter drill blanks; and a 0.100 inch thick disc for 0.225 inch diameter drill blanks.

Referring now to FIG. 8, I have found that slightly skewing the cutting disc so that angle D is in the range of about 8° to about 12°, preferably about 10°, provides even further advantages in the utility of the diamond grinding wheels. The drill rod blank is mounted in the chuck as described in FIG. 7 above. Instead of aligning the center line 75 of the disc 70 parallel to coincide with axis of the rod 80, the disc is skewed to the acute angle D. The rotating disc is then advanced to make a first cut in the drill rod blank with the leading radial segment 77 advancing along the drill rod axis line 76. Once the first cut is made, the disc is lowered for a second equal cut and the rotating disc is retracted. In the second cut, the radial segment 78 is the leading segment. With equal depths of cuts and with an equal number of passes in advancing and retracting the rotating diamond disc, a uniform radius is maintained and the wheel requires essentially no dressing. The skewing of the diamond wheel and the consequent alternating of radial segments which act as the lead segments provides uniform wear on the segments and is an important feature of my invention and may have a more general utilization generating flutes in carbide drills with diamond wheels.

It should be apparent from the description of how the drills are made that the arcuate flute in the drill may also be essentially described as generated by the intersection of a semi-cylindrical surface, i.e. the movement of the semi-circular peripheral segment of the disc, with the cylindrical surface drill rod.

Tests conducted on epoxy resin bonded laminates having plural layers of Kevlar fiber reinforcing fabric layers have demonstrated excellent hole quality. "Kevlar" is a DuPont trademark for an aromatic polyamide (aramid) of extremely high tensile strength and greater resistance to elongation than steel. Composites containing the Kevlar fabric have sufficient strength to be employed for structural sheets in aircraft. The tool described herein is particularly suited for drilling various Kevlar reinforced composites and can be economically manufactured by the described methods.

It should be understood that the foregoing description of the present invention is susceptible to various modifications, changes and adaptations, and the same are intended to be within the meaning and range of equivalents of the appended claims.

When the grinding wheel is skewed (see FIG. 8) $R_2$ should be selected so that it is equal to or up to about 10% less than $R_1$. This is because the flute radius will be somewhat larger than $R_2$, i.e. the flute radius will be equal to the shadow or projected path of the wheel, which is larger than $R_2$.

I claim:

1. A rotatable carbide drill, suitable for generating holes in a composite material of an organic resin binder and aramid fibers, comprising:
    (a) a generally cylindrical rod having an axis of rotation and an outer cylindrical surface, (b) an inclined planar end surface defining an ellipse, said planar surface defining an acute angle with said rod axis, and (c) an axially inclined arcuate shaped flute intersecting the outer surface of the cylindrical rod to form first and second cutting edges and intersecting said planar end surface to form at least one cutting point.

2. The drill of claim 1 wherein said acute angle is from about 15° to about 45°.

3. The drill of claim 2 wherein the cylindrical rod has a cylindrical surface with a first radius and said arcuate flute has a radius essentially equal to one-half of said first radius.

4. The drill of claim 2 wherein the ellipse of said planar end surface has a major axis and minor axis and said one cutting point is located substantially at the intersection of said major axis and the longest line of the cylindrical surface, so that said one cutting point can function as the lead cutting point.

5. The drill of claim 4 wherein said first and second cutting edges intersect said planar end surface to form said lead cutting point and a second trailing cutting point, longitudinally spaced from said lead point.

6. The drill of claim 5 wherein said trailing cutting point leads the minor axis of said ellipse.

7. The drill of claim 6 wherein said arcuate flute becomes progressively and uniformly shallower as it proceeds from the lead cutting point to its terminus in the cylindrical surface of the rod.

8. A rotatable carbide drill, suitable for generating holes in materials containing aramid fibers, comprising:

(a) a rod having an axis and an outer cylindrical surface, (b) a planar elliptical end surface having major and minor axes, (c) an arcuate flute, intercepting said elliptical end surface within one leading quadrant thereof and having a semi-cylindrical section at the intercept, the arcuate flute growing shallower as it progresses longitudinally along said rod, away from said intercept.

9. The drill of claim 8 wherein the axis of the arcuate flute is angularly skewed from the rod axis.

10. The drill of claim 9 wherein said axes form an acute angle from about 8° to about 12°.

* * * * *